(12) United States Patent
Sharma et al.

(10) Patent No.: US 8,537,846 B2
(45) Date of Patent: Sep. 17, 2013

(54) DYNAMIC PRIORITY QUEUE LEVEL ASSIGNMENT FOR A NETWORK FLOW

(75) Inventors: Puneet Sharma, Palo Alto, CA (US); Jean Tourrilhes, Mountain View, CA (US); Praveen Yalagandula, Redwood City, CA (US); Jung Gun Lee, Palo Alto, CA (US); Sung-Ju Lee, San Francisco, CA (US); Sujata Banerjee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 12/768,722

(22) Filed: Apr. 27, 2010

(65) Prior Publication Data

US 2011/0261831 A1  Oct. 27, 2011

(51) Int. Cl.
*H04L 12/28* (2006.01)

(52) U.S. Cl.
USPC ............................ 370/412; 370/413; 709/230

(58) Field of Classification Search
USPC .................................. 370/412, 413; 709/230
See application file for complete search history.

(56) References Cited

U.S. PATENT DOCUMENTS

| | | | |
|---|---|---|---|
| 6,021,115 A * | 2/2000 | Simpson et al. ............... | 370/235 |
| 6,611,522 B1 * | 8/2003 | Zheng et al. ............... | 370/395.21 |
| 6,771,706 B2 | 8/2004 | Ling et al. | |
| 7,020,110 B2 | 3/2006 | Walton et al. | |
| 7,072,413 B2 | 7/2006 | Walton et al. | |
| 7,177,369 B2 | 2/2007 | Crilly, Jr. | |
| 7,450,508 B2 | 11/2008 | Cha et al. | |
| 7,535,969 B2 | 5/2009 | Catreux et al. | |
| 2002/0075882 A1 | 6/2002 | Donis et al. | |
| 2002/0141427 A1 * | 10/2002 | McAlpine ..................... | 370/413 |
| 2003/0048856 A1 | 3/2003 | Ketchum et al. | |
| 2003/0236904 A1 | 12/2003 | Walpole et al. | |
| 2004/0151197 A1 | 8/2004 | Hui | |
| 2004/0192218 A1 | 9/2004 | Oprea | |
| 2007/0067476 A1 | 3/2007 | Karhinen et al. | |
| 2007/0118636 A1 | 5/2007 | Yang et al. | |
| 2007/0189293 A1 | 8/2007 | Yamada et al. | |
| 2008/0219279 A1 | 9/2008 | Chew | |
| 2009/0059786 A1 | 3/2009 | Budampati et al. | |
| 2009/0161684 A1 * | 6/2009 | Voruganti et al. ............. | 370/412 |

(Continued)

FOREIGN PATENT DOCUMENTS

WO   WO 2010007143 A1   1/2010

OTHER PUBLICATIONS

Tsai, et al., "MAQ: A Multiplexed Adaptive Queuing Protocol for QoS Adaptation", IEEE Publication Date: Mar. 17-21, 2002, vol. 1, pp. 307-316.

(Continued)

*Primary Examiner* — Wei Zhao

(57) ABSTRACT

Forwarding a flow in a network includes receiving the flow at a switch, determining an optimized priority queue level of the flow at the switch, and forwarding the flow via the switch using an optimized priority queue level of the flow at the switch. The flow passes through a plurality of switches, including the switch, in the network, and the optimized priority queue level of the flow at the switch is different from a priority queue level of the flow at a second switch of the plurality of switches. The second switch routes the flow at the second switch using the different priority queue level for the flow.

15 Claims, 5 Drawing Sheets

(56) References Cited

U.S. PATENT DOCUMENTS

| | | |
|---|---|---|
| 2009/0312045 A1 | 12/2009 | Miller et al. |
| 2010/0014540 A1 | 1/2010 | Brocke et al. |
| 2010/0046368 A1 | 2/2010 | Kaempfer et al. |
| 2010/0074187 A1 | 3/2010 | Sun et al. |
| 2010/0118883 A1* | 5/2010 | Jones et al. .................. 370/412 |
| 2011/0261831 A1 | 10/2011 | Sharma et al. |

OTHER PUBLICATIONS

Gray, et al., "Concern Separation for Adaptive QoS Modeling in Distributed Real-Time Embedded Systems", Retrieved from http://www.dre.vanderbilt.edu/~schmidt/PDF/final-uab-vanderbilt-IGI-bookchapter.pdf, 2009, 25 pages.

* cited by examiner

DYNAMIC PRIORITY QUEUE LEVEL ASSIGNMENT FOR A NETWORK FLOW

RELATED APPLICATION

The present application contains some common subject matter with U.S. patent application Ser. No. 12/768,723, entitled "Priority Queue Level Optimization for a Network Flow", filed on Apr. 27, 2010, by Puneet Sharma et al., which is incorporated by reference in its entirety.

BACKGROUND

The scale of computing infrastructure has experienced explosive growth at least partially due to multiple applications being supported on network fabric. For instance, data centers support multiple applications on the same infrastructure. Similarly, in an enterprise setting, multiple services like VoIP and traditional best-effort traffic may co-exist concurrently on a single network. In most instances, existing networks are designed for best-effort traffic, and they are unable to meet strict and sometimes orthogonal quality-of-service (QoS) requirements, such as high bandwidth and low latency for certain applications. The networks are over provisioned or there is no mechanism to shield applications from each other.

Two of the most commonly adopted techniques to sustain QoS are network isolation and network over-provisioning. Data center networks, for instance, have isolated networks with specialized hardware and communication protocols for each class of traffic. In some cases, networks are over-provisioned by a large factor of 2.5× to 8× to avoid QoS violations. Both solutions can lead to heavy under-utilization and are not cost effective.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well-known methods and structures may not be described in detail to avoid unnecessarily obscuring the description of the embodiments. Also, the embodiments may be used in combination with each other.

According to an embodiment, a QoS controller determines per-switch priority levels for a flow to maintain flow QoS requirements. The QoS controller may assign different priorities for the same flow in different switches that form an end-to-end path for the flow in a network. Through implementation of the embodiments, diverse QoS requirements of different flow classes may be concurrently satisfied in a single network.

A flow comprises an aggregation of packets between a source and a destination in a network. For instance, all hypertext transport protocol (HTTP) packets between two hosts may be defined as a flow. A flow may be a subset of another flow. For example, a specific HTTP connection from the source to the destination can be a subset of all HTTP packets from the source to the destination. In addition, more than one flow can be aggregated and a flow can be disaggregated into multiple flows. A flow may be bidirectional or unidirectional.

Figure 1:
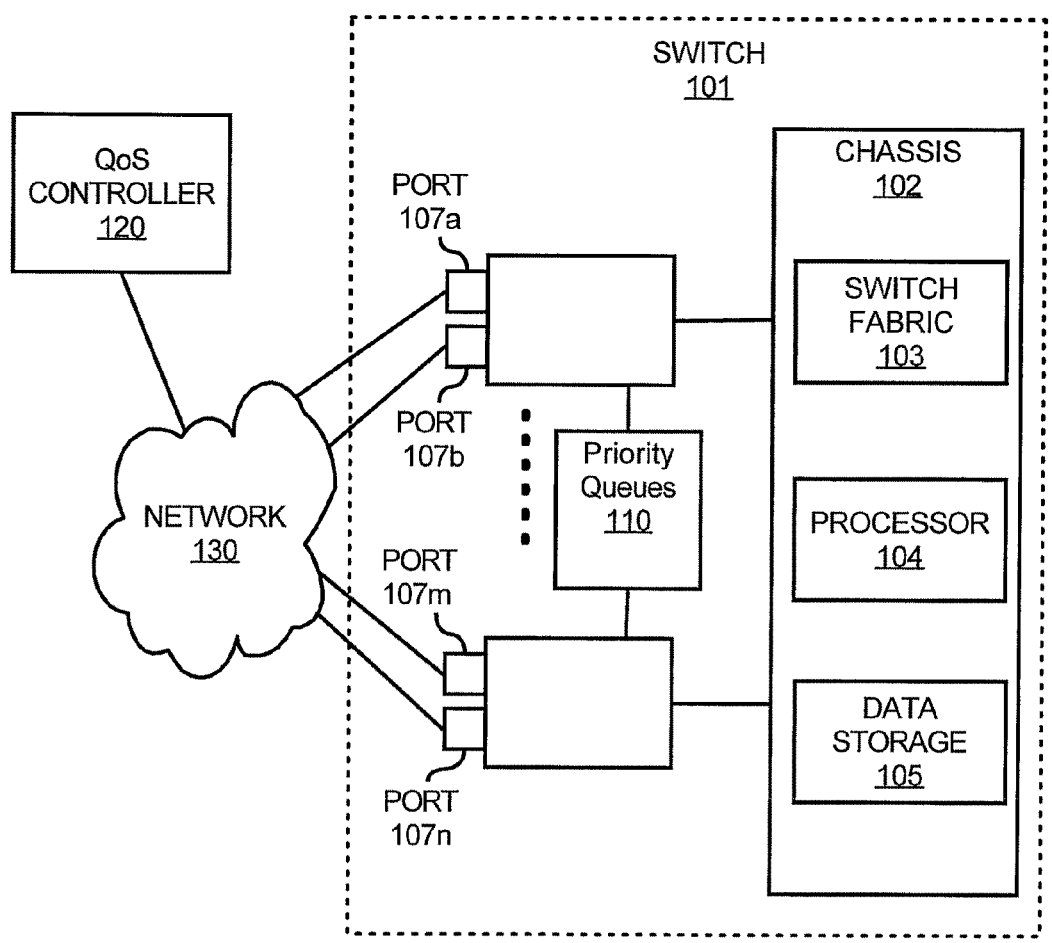
FIG. 1 shows a simplified block diagram of a switch in a flow forwarding system, according to an embodiment of the present invention.

FIG. 1 illustrates a switch 101 in a flow forwarding system 100, according to an embodiment. It should be clearly understood that the system 100 and the switch 101 may include additional components and that some of the components described herein may be removed and/or modified without departing from a scope of the system 100 and/or the switch 101. The system 100 includes a network 130 and a Quality-of-Service (QoS) controller 120. Although not shown, the QoS controller 120 may be replicated or its function split among multiple QoS controllers throughout the network 130. Additionally, the system 100 may include any number of switches, end hosts, and other types of network devices, which may include any device that can connect to the network 130. Devices in the network may be referred to as nodes. Also, the end hosts may include source devices and destination devices.

The switch 101 includes a set of ports 107a-n. The ports 107a-n are configured to receive and send flows in the network 130. The switch 101 also includes a chassis 102. The chassis 102 includes switch fabric 103, a processor 104, and data storage 105. The switch fabric 103 may include a high-speed transmission medium for routing packets between the ports 107a-n internally in the switch 101. The switch 101 may be configured to maximize a portion of packet-processing. The processor 104 and the storage 105 may be used for processing, or storing data. The switch 101 also includes priority queues 110. The switch may include multiple priority queues for each port. The priority queue may be on a line card or provided elsewhere in the switch. The priority queue includes priority levels. Received packets may be stored in the priority queue in a specific level and then processed according to the level. Priority queues are further described below with respect to FIG. 3.

The QoS controller 120 provides a global set of rules for the network 130. For instance, a manager or administrator may enter the global set of rules into the QoS controller 120. The QoS controller 120 thereafter maintains global policies using the global set of rules for the network 130. The global rules may be based on quality of services (QoS) and performance goals. The QoS controller 120 determines a current load on the switches in the network 130, for example, based on metric reports from nodes in the network 130. The QoS controller 120 also maintains a current topology of the network 130 through communication with the switch 101 and other nodes in the network 130.

The QoS controller 120 may use the topology of the network 130 and the load on the network 130 in a feedback control system to direct switches, including the switch 101, to make adjustments to maintain global policies specified in the global rules. For instance, certain flows, as specified by rules provided by the QoS controller 120, through the switch 101 may be rate limited, or a flow may be routed through other switches in the network 130.

In one embodiment, based on rules received from the QoS controller 120 and stored at the switch 101, the switch 101 may thereafter reliably forward each of the flows using a single path or multiple paths as defined in the rules. The QoS controller 120 may asynchronously (i.e., independent of a flow setup request) send an update to the switch 101 to change rules at the switch 101. New local rules may be received in an instruction from the QoS controller 120 based on the metric report. For instance, a flow may be rate-limited depending on bit rate through other switches in the network 130. Alternately, the QoS controller 120 may place a timeout or expiration (in terms of seconds) or a limit (in terms of a number of flows) on the switch 101.

Figure 2:
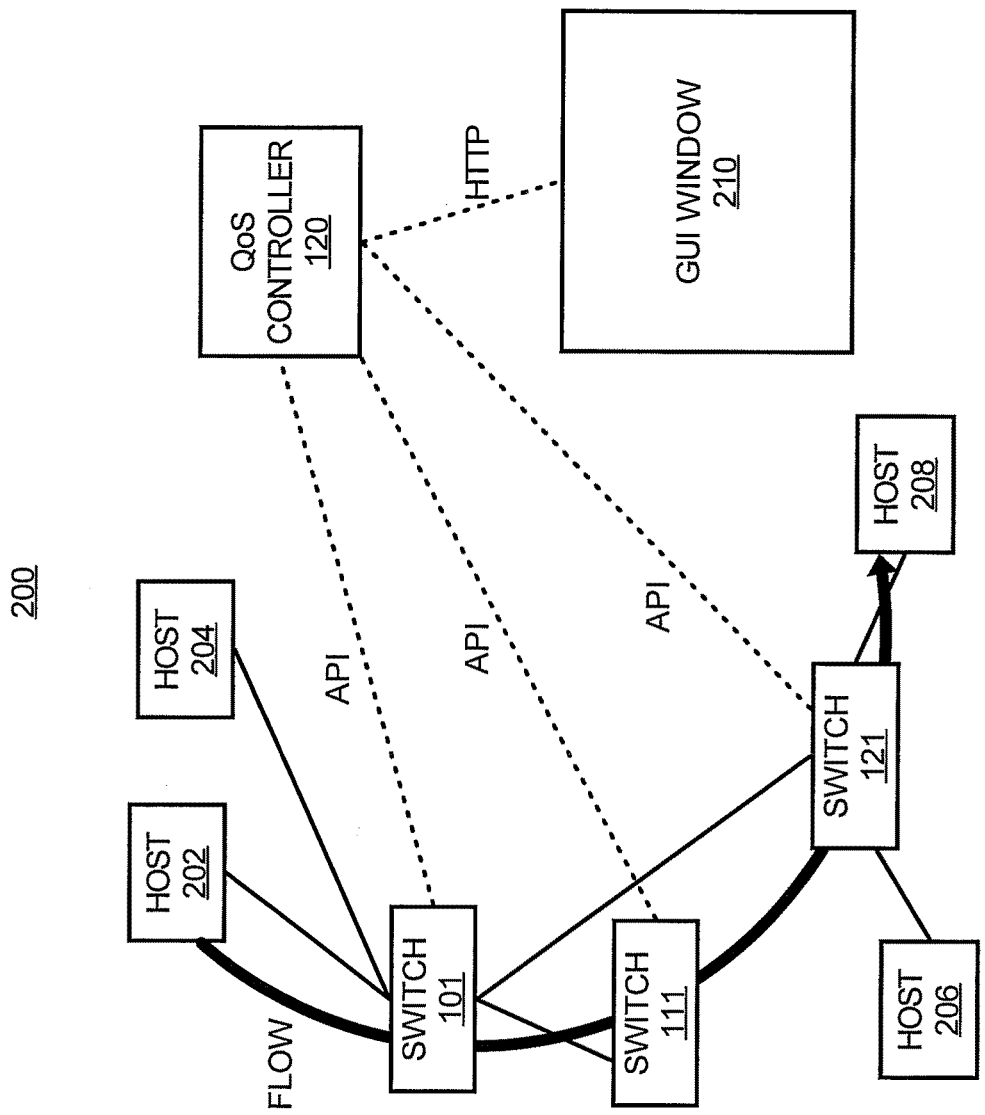
FIG. 2 illustrates a block diagram of a flow forwarding system, according to an embodiment of the present invention.

FIG. 2 illustrates a block diagram of a flow forwarding system 200, according to an embodiment of the present invention. The system 200 may include the components of the system 100 shown in FIG. 1. It should be clearly understood that the system 200 may include additional components and that some of the components described herein may be removed and/or modified without departing from a scope of the system 200. The system 200 includes the QoS controller 120. The system 200 includes a plurality of switches including the switches 101, 111, and 121. The system 200 further includes a host 202, a host 204, a host 206, a host 208, and a graphical user interface (GUI) window 210. The QoS controller 120 may use any type of application programming interface (API) to communicate with the switches 101, 111, and 121. It should be clearly understood that the embodiments are not limited to a specific API. For example, QoS APIs or OpenFlow APIs may be used without departing from a scope of the invention. In addition, the embodiments may also use other configuration protocols, such as simple network management protocol (SNMP).

In one embodiment, the system 200 receives QoS requirements for flows. For example, an administrator may input QoS requirements to the QoS controller 120 using the GUI window 210, and automates the process of deriving configuration specifications and configuring the switches using the QoS controller 120. By way of example, the inputs to the QoS controller 120 include different QoS requirements for new flows, such as bandwidth and delay thresholds.

Each flow may be identified through bits in one or more header fields in network packets (e.g., source IP). In one embodiment, each flow is identified based on flow specifications. Flow specifications are defined as a set of header fields, but there are wildcard fields to identify multiple flows belonging to a group. Each flow specification may have a reference to slice specifications that specify performance requirement for the flows in the slice. A slice is a network slice and the term "slice" may interchangeably be used with a service or a network service. The QoS controller 120 may reserve resources for the flow in the slice. In one embodiment, the switch 101 receives the packets at the ports 107a-n (as shown in FIG. 1). The switch 101 generates a flow specification from the packet by extracting certain header fields, and other meta-information, and then looks up the flow in its flow table.

The system 200 makes available existing hardware switch capability in a flexible manner to the QoS controller 120. In one embodiment, the switches 101, 111, and 121 implement the CEE (Converged Enhanced Ethernet) and DiffServ QoS frameworks, which is internally based on rate limiters and priority queues. The system 200 is operable to allocate flows flexibly to those rate limiters and priority queues.

By way of example, a flow illustrated as a thick arrow is routed from the host 202 to the host 208 via the switch 101, the switch 111, and the switch 121 in FIG. 2. When the flow routes from the host 202 to the host 208 via the switch 101, the switch 111, and the switch 121 (or when the flow is first received prior to being routed by the switches), the system 200 receives a QoS requirement for the flow and derives configuration specifications and configures the switches using the QoS controller 120 to accommodate the QoS requirement (e.g., bandwidth and delay thresholds) for the flow. By way of example, in FIG. 2, the QoS controller 120 communicates with the switch 101, the switch 111, and the switch 121 through switch configuration APIs (dashed lines) to collect information about network states such as topology and performance metrics. When the flow is to be routed in the network (from the host 202 to the host 208), the QoS controller 120 calculates resource allocation based on the database and performance models. Then, the QoS controller 120 installs a rate limiter in the flow's edge switch, and configures each priority queue level at each switch in the flow path, such as the switch 101, the switch 111, and the switch 121.

Figure 3:
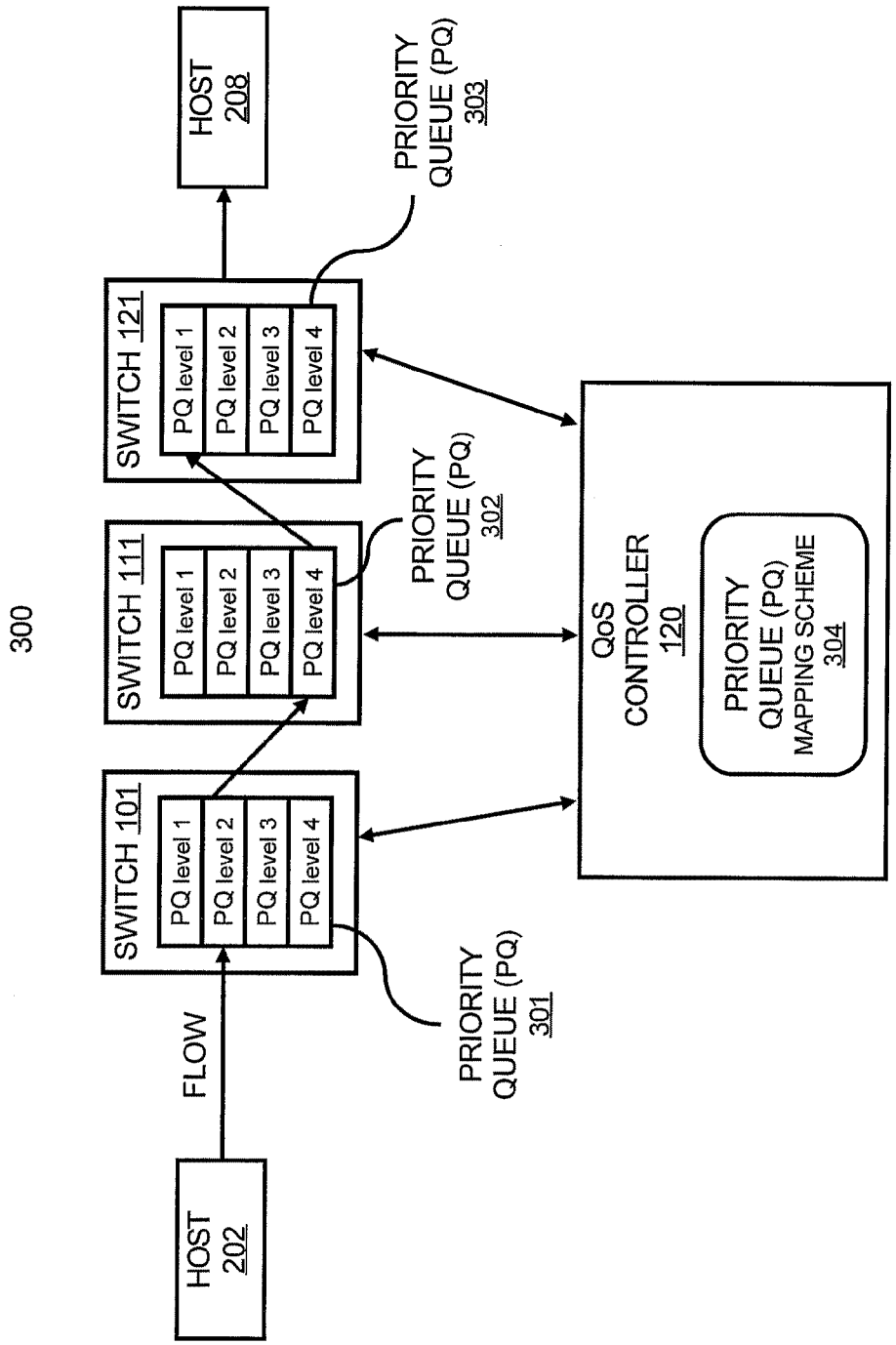
FIG. 3 illustrates a block diagram for flow forwarding based on a priority queue mapping scheme, according to an embodiment of the present invention.

FIG. 3 illustrates a block diagram 300 for flow forwarding based on a priority queue mapping scheme 304, according to an embodiment of the present invention. It should be clearly understood that the block diagram 300 may include additional components and that some of the components described herein may be removed and/or modified without departing from a scope of the priority queue mapping scheme 304 in the block diagram 300. Using the priority queue mapping scheme 304, the QoS controller 120 may map flows to one of multiple priority queue levels. Placing flows in the higher priority queue levels may increase the flows' throughput and decrease their latency. The QoS controller 120 manages flow mapping dynamically across all flows and on a per switch basis using the priority queue mapping scheme 304 to achieve fine grained reactive control.

For each switch, the priority queue mapping scheme 304 used by the QoS controller 120 for dynamic priority mapping includes mapping different flows to different priority queue levels irrespective of the incoming priority queue level of the flow. Each of the switches 101, 111, and 121 is shown as having priority queues 301-303 respectively. Priority queue 301 may be included in priority queues 110 shown in FIG. 1. It should be noted that each switch is shown with a single queue by way of example, and each switch may have multiple queues such as queues for each port. Each queue includes queue priority levels, shown as PQ levels 1-4 by way of example. More or less than four priority queue levels may be used. As packets for each flow are received, they are stored in a priority queue level and then processed for forwarding towards a destination according to their level. Packets may be stored in a specific priority queue level based on a priority of the flow for the packets. Packets in a higher priority queue level, for example, are processed first for forwarding. Different switches may have different priority queue levels for the same flow and the same switch may have different priority queue levels for different flows. When a packet is received, the priority queue level is determined from the packet header and put into the associated priority queue level. For example, a VoIP flow may require a relatively short delay, and a flow of a large file may require a relatively high bandwidth. Thus, when the VoIP flow and the flow of the large file route via the switch 101, the VoIP flow and the flow of the large file may have different priority queue levels at the switch 101 according to the dynamically changing traffic load in the switch 101.

Likewise, when the VoIP flow and the flow of the large file route via the switches 111 and 121, the VoIP flow and the flow of the large file may have different priority queue levels at the switches 111 and 121 according to the dynamically changing traffic load in the switches 111 and 121. The priority queue level for the VoIP flow at the switch 101 may be different from the priority queue levels for the VoIP flow at the switches 111 and 121 because the switches 101, 111, and 121 are different switches having different configuration specifications and different traffic loads.

In one embodiment, when a new flow with QoS requirements arrives in the network 130, the QoS controller 120 dynamically computes the priority queue levels for the flow at each switch in the flow path, such as the switch 101, the switch 111, and the switch 121. The priority queue level assigned to each switch for a particular flow is referred to as a mapping. The mappings for the switches may be decided based on the current utilization/traffic in each switch along the flow path. By way of example, in FIG. 3, the priority queue level for the flow at the switch 101 is the second level, which has a priority queue (PQ) 2, the priority queue level for the flow at the switch 111 is the fourth level, which has a PQ 4, and the priority queue level for the flow at the switch 121 is the first level, which has a PQ 1. Thus, the flow may be routed via the switch 101, the switch 111, and the switch 121 according to the priority queue levels, PQ 2, PQ 4, and PQ 1, respectively. The priority queue level of the flows may be changed along various path hops, such as the switch 101, the switch 111, and the switch 121 in FIG. 3, to increase the resource utilization of the network 130 while still guaranteeing the QoS requirements of the flows.

In one embodiment, the priority queue mapping may be done by changing or modifying a type of service (ToS) bit on all the packets of the flow when the flow traverses each switch based on mappings installed in the device by the QoS controller 120. In another embodiment, the priority queue mapping may be done by changing or modifying a virtual local area network (ULAN) priority ceiling protocol (PCP) bit on all the packets of the flow when the flow traverses each switch based on mappings installed in the device by the QoS controller 120. In yet another embodiment, the priority queue mapping may be done by directly inserting or placing the packet into the appropriate queue of each switch based on mappings installed in the device by the QoS controller 120. As the load on the network 130 changes, new mappings for various existing flows may be dynamically computed and installed. Thus, the priority queue mapping scheme 304 provides per-flow QoS guarantees while utilizing the network resources better by identifying the individual flow requiring QoS and dynamically optimizing the priority queue levels of the flow along the path taken by the flow.

The dynamic mappings based on the priority queue mapping scheme 304 are more flexible than the conventional static tagging because the QoS controller 120 is able to decide the mappings based on the current workloads in each switch, such as the switch 101, the switch 111, and the switch 121. In conventional tagging, the priority queue level of each flow remains the same throughout the path and this may result in underutilization of resources. Through the system 200, the QoS controller 120 collects states of the network and manages databases about topology, active flows, and available resources in networks. The collected states may include measured metrics related to the topology, active flows, and available resources in networks. Based on the databases and end-to-end performance models, the QoS controller 120 may decide resource allocations for the new incoming flows in network 130. By way of example, the output of the QoS controller 120 includes priority queue levels for a new flow at each switch in a path for the flow. Resources for flows are reserved in the switch 101, the switch 111, and the switch 121 through the system 200. Through implementation of the priority queue mapping scheme 304, the network fabric convergence may be improved by providing automated and scalable QoS control for various flow types with varying QoS requirements or multiple tenants on single network with performance isolation requirements without need for over-provisioning the network or running the risk of QoS violations.

Methods in which the systems 100 and 200 may be employed for dynamically forwarding flows will now be described with respect to the following flow diagram of the method 400 depicted in FIG. 4. It should be apparent to those of ordinary skill in the art that the method 400 represents generalized illustrations and that other steps may be added or existing steps may be removed, modified or rearranged without departing from the scope of the method 400.

The descriptions of the method 400 are made with reference to the systems 100 and 200 illustrated in FIGS. 1 and 2, and thus makes reference to the elements cited therein. It should, however, be understood that the method 400 is not limited to the elements set forth in the systems 100 and 200. Instead, it should be understood that the method 400 may be practiced by a system having a different configuration than that set forth in the systems 100 and 200.

Figure 4:
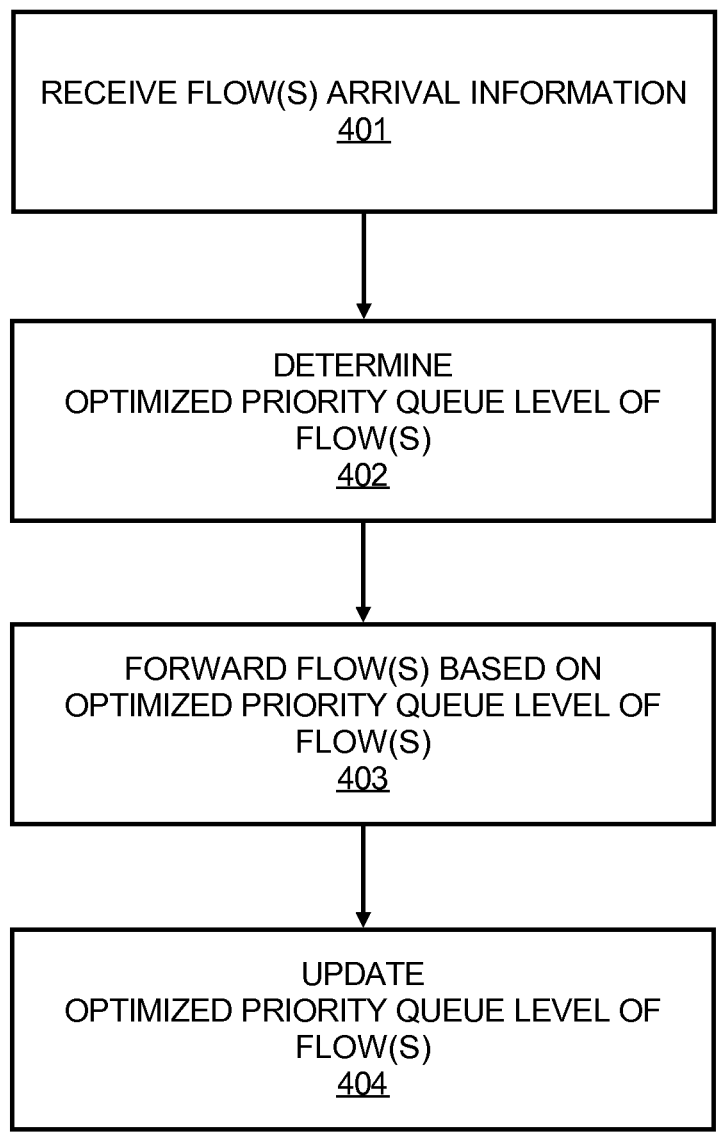
FIG. 4 illustrates a flowchart of a method for forwarding flows in a network, according to an embodiment of the present invention.

With reference to FIG. 4, there is shown a flowchart of a method 400 for dynamically forwarding flows in a network, according to an embodiment. The method 400 may be performed at the switch 101. The processor 104 in the switch 101 may implement or execute the system 100 to perform one or more of the steps described in the method 400 in forwarding flows in the network 130. In another embodiment, the QoS controller 120 devolves some controls to a subset of co-operating switches rather than each switch acting alone in conjunction with the QoS controller 120. The cooperation between switches may be done via an inter-switch control/management protocol in addition to the QoS controller 120 issued commands.

At step 401, the switch 101 receives flow arrival information. The switch 101 may also receive a flow. The flow passes through a plurality of switches, such as the switch 101, the switch 111, and the switch 121 in the flow forwarding system 200.

At step 402, the switch 101 determines an optimized priority queue level of the flow at the switch 101. An optimized priority queue level of the flow is a priority queue level that is determined based at least on one or more QoS requirements for the flow and may additionally be based on the network state and other information. The optimized priority queue level for a flow may be different for different switches in the flow path. The switch 101 may determine the optimized priority queue level of the flow at the switch 101 based on the information communicated from the QoS controller 120. The information communicated from the QoS controller 120 may include a QoS requirement for the flow. Thus, the optimized priority queue level of the flow at the switch 101 may be determined based on the QoS requirement for the flow. For example, the switch 101 may determine the optimized priority queue level of the flow at the switch 101 that maximizes the QoS requirement for the flow in the flow forwarding system 200. The optimized priority queue level of the flow at the switch 101 may be different from the priority queue level of the flow at the switch 111 and the switch 121. In another example, the QoS controller 120 determines the optimized priority queue level of the flow for each switch in the flow path based on the QoS requirement for the flow and existing flow requirements handled by the switches, and then sends the optimized priority queue level of the flow to each switch. Then, each switch implements the received optimized priority queue level of the flow. The implementing includes storing packets for the flow in a queue having the optimized priority queue level, whereby, for example, packets in higher queues are forwarded first.

At step 403, the switch 101 routes the flow based on the optimized priority queue level of the flow at the switch 101 to the next switch, which is the switch 111. For example, packets in higher queues are routed first. When the switch 101 routes the flow to the switch 111, packets for the flow may be stored at a different priority queue level for the flow at the switch 111 than the priority queue level for the flow at the switch 101.

At step 404, the switch 101, through the QoS controller 120, may update the optimized priority queue level of the flow at the switch 101. In one embodiment, the switch 101 may determine and update the optimized priority queue level of the flow at the switch 101 based on a current workload in the switch 101. In another embodiment, the switch 101 may determine and update the optimized priority queue level of the flow at the switch 101 relative to an optimized priority queue level of another flow at the switch 101. The switch 101 may route the flow via the switch 101 based on the updated optimized priority queue level of the flow at the switch 101. The updated priority queue level may be determined by the switch or the QoS controller 120.

Here, the optimized priority queue level of the flow at each of the plurality of switches may be relative to an optimized priority queue level of different flows at each of the plurality of switches. For instance, when there are two different flows, flow 1 and flow 2, the QoS controller 120 maps flow 1 based on the optimized priority queue level of flow 1 at each of the switches. In this situation, the optimized priority queue level of flow 1 at each of the switches, 101, 111, and 121 may be determined by considering the optimized priority queue level of flow 2, which is also routed by each of the switches, 101, 111, and 121. The priority queue levels of other flows routed by a switch are considered because inserting a new flow may impact existing flows. The QoS controller 120 may map the flow based on the optimized priority queue level of the flow at each of the switches, 101, 111, and 121 either before or after receiving the flow at the switches, 101, 111, and 121.

Figure 5:
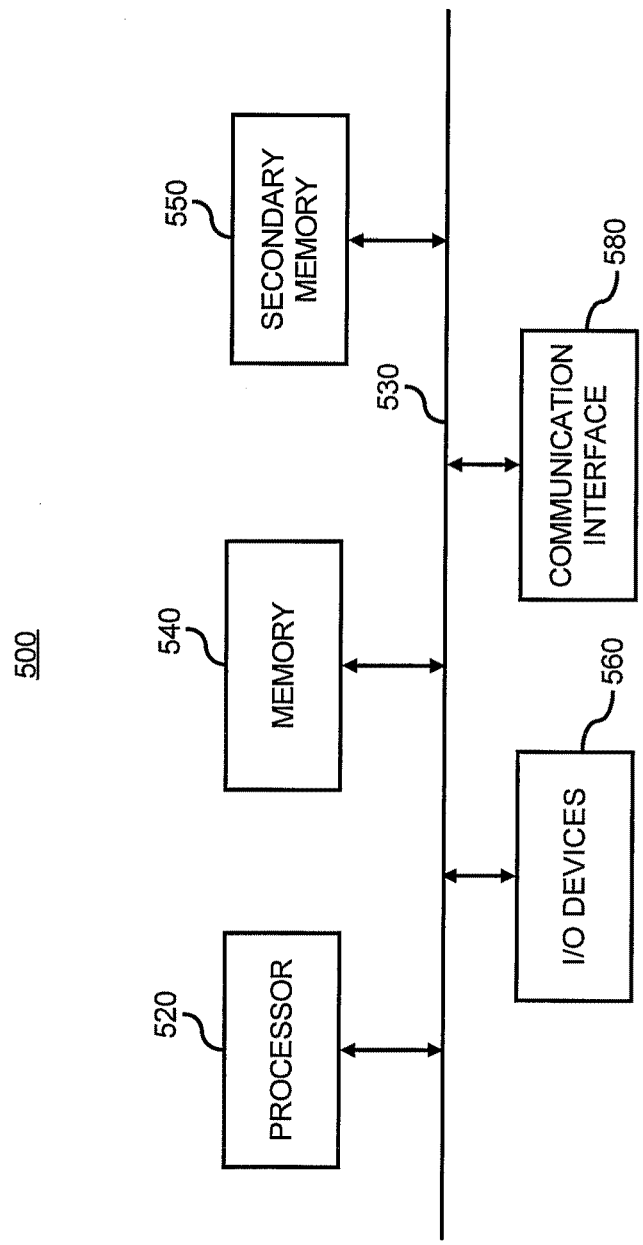
FIG. 5 shows a block diagram of a computing apparatus that may be used as a platform to implement or execute one or more of the processes depicted in FIG. 4, according to an embodiment of the present invention.

FIG. 5 shows the block diagram of a computer system 500 that may be used as a platform for a device configured to route flows in a network. The computer system 500 may also be used to execute one or more computer programs performing the methods, steps and functions described herein. The computer programs are stored in computer storage mediums.

The computer system 500 includes a processor 520, providing an execution platform for executing software. The processor 520 is configured to route a flow in a network. The processor 520 is configured to receive the flow at a switch when the flow passes through a plurality of switches, including the switch, in the network, to determine an optimized priority queue level of the flow at the switch that is different from a priority queue level of the flow at a second switch of the plurality of switches, and to route the flow via the switch using the optimized priority queue level of the flow at the switch. The second switch routes the flow at the second switch using the different priority queue level for the flow.

At each of the plurality of switches, the processor 520 is further configured to map the flow to an optimized priority queue level of the flow, to modify a ToS bit on packets of the flow based on the mappings while the flow passes through the plurality of switches, to modify a VLAN PCP bit on packets of the flow based on the mappings while the flow passes through the plurality of switches, and to place a packet of the flow in a queue in the switch associated with the optimized priority queue level of the flow at the switch. The processor 520 is configured to determine the optimized priority queue level of the flow at the switch based on a QoS requirement for the flow, to update the optimized priority queue level of the flow at the switch based on a current workload in the switch, and to route the flow via the switch based on the updated optimized priority queue level of the flow at the switch.

Commands and data from the processor 520 are communicated over a communication bus 530. The computer system 500 also includes a main memory 540, such as a Random Access Memory (RAM), where software may reside during runtime, and a secondary memory 550. The secondary memory 550 may include, for example, a nonvolatile memory where a copy of software is stored. In one example, the secondary memory 550 also includes ROM (read only memory), EPROM (erasable, programmable ROM), EEPROM (electrically erasable, programmable ROM), and other data storage devices, include hard disks. The main memory 540 as well as the secondary memory 550 may store the optimized priority queue levels of different flows at different switches as discussed before.

The computer system 500 includes I/O devices 560. The I/O devices may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface. The communication interface 580 is configured to input information used to determine the optimized priority queue levels of different flows at different switches. The communication interface 580 is also configured to input information used to maximize the QoS requirement for the flow in the network.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method of managing a flow through a network, comprising:

receiving, at a controller, network performance data from a plurality of switches of the network, wherein the flow passes through the plurality of switches;

determining, with the controller, respective priority queue levels for the flow through each of the plurality of switches based on the network performance data;

mapping, with the controller, the flow to an optimized priority queue level of the flow at each of the plurality of switches, wherein mapping the flow includes modifying virtual local area network (VLAN) priority ceiling protocol (PCP) bits on packets of the flow based on the mappings while the flow passes through the plurality of switches; and assigning, with the controller, one of the respective priority queue levels to each switch.

2. The method of claim 1, wherein the optimized priority queue level of the flow at each of the plurality of switches is determined based on at least one other flow being routed by each respective switch.

3. The method of claim 1, wherein the method includes modifying Type of Service (ToS) bits on the packets of the flow based on the mappings while the flow passes through the plurality of switches.

4. The method of claim 1, wherein the method includes placing a packet of the flow in the priority queue level of a priority queue at a switch, wherein the priority queue has a plurality of priority levels.

5. The method of claim 1, wherein the method includes determining, with the controller, the priority queue level of the flow at a switch based on a Quality of Service (QoS) requirement for the flow.

6. The method of claim 1, wherein the method includes determining, with the controller, the priority queue level of the flow at a switch based on a current workload in the switch.

7. The method of claim 6, wherein the method includes updating, with the controller, the priority queue level of the flow at the switch relative to a priority queue level of another flow at the switch.

8. The method of claim 1, wherein the method includes determining, with the controller, the priority queue level of the flow at a switch that maximizes a Quality of Service (QoS) requirement for the flow in the network.

9. A system for managing a flow through a network, comprising:
a plurality of switches of the network, wherein each switch is configured to modify virtual local area network (VLAN) priority ceiling protocol (PCP) bits on packets of the flow based on a priority queue mapping for a next switch in a flow path associated with the flow; and
a controller, configured to:
receive, from the plurality of switches, network performance data, wherein the flow passes through the plurality of switches;
determine respective priority queue levels for the flow through each switch based on the network performance data; and
assign one of the respective priority queue levels to each switch.

10. The system of claim 9, wherein each switch is configured to modify Type of Service (ToS) bits on the packets of the flow based on the priority queue mapping for a next switch in a flow path associated with the flow.

11. The system of claim 9, wherein each switch is configured to place a packet of the flow in the priority queue level of a priority queue at the switch, wherein the priority queue includes a plurality of priority levels.

12. The system of claim 9, wherein the controller is configured to determine the priority queue level of the flow at a switch based on a QoS requirement associated with the flow.

13. The system of claim 12, wherein the controller is configured to:
determine the priority queue level of the flow at the switch based on a current workload in the switch;
update the priority queue level of the flow at the switch relative to a priority queue level of another flow at the switch; and
route the flow via the switch based on the updated priority queue level of the flow at the switch.

14. A non-transitory computer-readable medium having instructions stored thereon, the instructions executable by a processor to:
receive, at a controller, network performance data from each of a plurality of switches of a network, wherein a flow passes through the plurality of switches;
determine, with the controller, respective priority queue levels for the flow through each switch based on the network performance data;
map the flow to a priority queue level of the flow at each of the plurality of switches, wherein the instructions include instructions to modify a virtual local area network (VLAN) priority ceiling protocol (PCP) bit on packets of the flow based on the mappings while the flow passes through the plurality of switches; and
assign, with the controller, one of the respective priority queue levels to each switch.

15. The non-transitory computer readable medium of claim 14, wherein the instructions include instructions to modify a Type of Service (ToS) bit on packets of the flow based on the mappings while the flow passes through the plurality of switches.

\* \* \* \* \*